(12) United States Patent
Schwammberger (10) Patent No.: US 12,538,882 B2
(45) Date of Patent: Feb. 3, 2026

(54) FLOATABLE ISLAND

(71) Applicant: GOBLUE WATER GMBH, Deisenhofen (DE)

(72) Inventor: Peter Schwammberger, Deisenhofen (DE)

(73) Assignee: GoBlue Water GmbH, Deisenhofen (DE)

( * ) Notice: Subject to any disclaimer, the term of this patent is extended or adjusted under 35 U.S.C. 154(b) by 163 days.

(21) Appl. No.: 18/010,155

(22) PCT Filed: Jun. 18, 2021

(86) PCT No.: PCT/EP2021/066646
§ 371 (c)(1),
(2) Date: Dec. 13, 2022

(87) PCT Pub. No.: WO2021/255253
PCT Pub. Date: Dec. 23, 2021

(65) Prior Publication Data
US 2023/0292685 A1 Sep. 21, 2023

(30) Foreign Application Priority Data
Jun. 18, 2020 (DE) .................... 10 2020 116 158.1

(51) Int. Cl.
*A01G 31/02* (2006.01)
*A01G 24/10* (2018.01)
*A01G 24/42* (2018.01)

(52) U.S. Cl.
CPC .............. *A01G 31/02* (2013.01); *A01G 24/10* (2018.02); *A01G 24/42* (2018.02)

(58) Field of Classification Search
CPC . E02B 17/00; B63B 2035/4493; A01G 24/10; A01G 24/48; A01G 24/46; A01G 24/44; A01G 24/42; A01G 31/02; A01K 61/75
USPC .............................................. 210/617, 170.05
See application file for complete search history.

(56) References Cited

U.S. PATENT DOCUMENTS

| | | | | |
|---|---|---|---|---|
| 3,710,510 A | * | 1/1973 | Tully | A01G 24/42 516/100 |
| 3,754,871 A | * | 8/1973 | Hessel | B01F 21/22 206/0.5 |
| 4,312,152 A | * | 1/1982 | Drury | A01G 31/02 47/87 |
| 4,536,988 A | * | 8/1985 | Hogen | A01G 31/02 56/8 |
| 4,607,454 A | * | 8/1986 | Koike | A01G 31/02 47/61 |

(Continued)

FOREIGN PATENT DOCUMENTS

| CN | 201610396 U | * | 10/2010 |
|---|---|---|---|
| CN | 107996371 A | * | 5/2018 |

(Continued)

OTHER PUBLICATIONS

International Search Report (English and German) and Written Opinion of the ISA (German) issued in PCT/EP2021/066646; ISA/EP.

*Primary Examiner* — Monica L Perry
(74) *Attorney, Agent, or Firm* — Harness, Dickey & Pierce, P.L.C.

(57) ABSTRACT

A floatable island includes at least one layer having a structure containing grains, the grains including an expanded mineral material.

13 Claims, 10 Drawing Sheets

(56) References Cited

U.S. PATENT DOCUMENTS

| | | | | |
|---|---|---|---|---|
| 4,822,579 A * | 4/1989 | Wagner | C02F 5/00 | 422/265 |
| 4,888,912 A * | 12/1989 | Murray | A01G 31/02 | 47/1.4 |
| 5,016,573 A * | 5/1991 | Power | A01K 39/00 | 119/428 |
| 5,189,984 A * | 3/1993 | Smith | A01K 39/01 | 119/52.2 |
| 5,261,185 A * | 11/1993 | Koide | A01G 31/02 | 47/65 |
| 5,312,601 A * | 5/1994 | Patrick | A01K 63/04 | 47/60 |
| 5,528,856 A * | 6/1996 | Smith | C02F 3/327 | 47/1.4 |
| 5,799,440 A * | 9/1998 | Ishikawa | C02F 3/025 | 47/1.4 |
| 6,086,755 A * | 7/2000 | Tepper | C02F 3/327 | 210/150 |
| 6,099,208 A * | 8/2000 | McAlister | E01H 4/00 | 405/195.1 |
| 6,673,241 B1 * | 1/2004 | Tung | A01C 3/028 | 210/242.1 |
| 6,918,353 B1 * | 7/2005 | Coroneos | A01K 39/0113 | 119/52.3 |
| 7,784,218 B2 * | 8/2010 | Kania | A01G 9/28 | 47/65.5 |
| 7,789,043 B2 * | 9/2010 | Kania | A01K 61/60 | 119/221 |
| 7,941,970 B2 * | 5/2011 | Kania | A01G 9/28 | 47/65.5 |
| 8,250,808 B2 * | 8/2012 | Kania | A01G 31/00 | 47/65.7 |
| 8,262,321 B1 * | 9/2012 | Saebi | E01D 15/14 | 405/195.1 |
| 8,382,982 B2 * | 2/2013 | Hondulas | C02F 3/109 | 210/242.1 |
| 8,443,749 B2 * | 5/2013 | Kania | B63B 35/44 | 114/264 |
| 8,641,893 B2 * | 2/2014 | Torres Junco | A01G 9/00 | 210/242.1 |
| 9,394,190 B2 * | 7/2016 | Curry | A01G 31/02 | |
| 9,756,792 B2 * | 9/2017 | Miller | A01G 9/02 | |
| 9,807,950 B2 * | 11/2017 | Day | A01G 31/02 | |
| 2005/0183331 A1 * | 8/2005 | Kania | A01K 61/70 | 47/65.5 |
| 2006/0243659 A1 * | 11/2006 | Svirklys | C02F 3/327 | 210/747.6 |
| 2010/0075400 A1 * | 3/2010 | Kania | A01G 9/28 | 114/294 |
| 2010/0236149 A1 * | 9/2010 | Kania | A01G 9/28 | 47/59 S |
| 2011/0259820 A1 * | 10/2011 | Songer | A01G 9/00 | 210/602 |
| 2015/0147925 A1 * | 5/2015 | Klare | B63B 35/58 | 441/74 |
| 2019/0112012 A1 * | 4/2019 | Boswell | A01G 31/02 | |
| 2019/0230877 A1 * | 8/2019 | Fulford | A01G 24/50 | |

FOREIGN PATENT DOCUMENTS

| | | | | |
|---|---|---|---|---|
| CN | 111393029 A * | 7/2020 | | |
| DE | 102011009424 A1 * | 6/2012 | | F24J 2/523 |
| EP | 0647093 B1 * | 8/1996 | | A01G 24/44 |
| EP | 2468088 B1 | 7/2013 | | |
| JP | 2002142583 A | 5/2002 | | |
| JP | 2002354951 A | 12/2002 | | |
| JP | 2003013424 A | 1/2003 | | |
| WO | WO-2014143716 A1 * | 9/2014 | | C09K 17/16 |
| WO | 2017200815 A1 | 11/2017 | | |
| WO | 2019104377 A1 | 6/2019 | | |
| WO | 2019185733 A1 | 10/2019 | | |

* cited by examiner

FLOATABLE ISLAND

CROSS-REFERENCE TO RELATED APPLICATIONS

This application is a National Phase of International Application No. PCT/EP2021/066646, filed on Jun. 18, 2021, which claims the benefit of German Patent Application No. 10 2020 116 158.1, filed on Jun. 18, 2020. The entire disclosures of the above applications are incorporated herein by reference.

FIELD

The present disclosure relates to a buoyant island, and to the use of a buoyant island.

BACKGROUND

This section provides background information related to the present disclosure which is not necessarily prior art.

Floatable islands are known, EP 2 468 088 B1 describes an adjustable vegetated buoyant island consisting of non-woven mesh and foam injections. JP 2003 013424 describes a buoyant island consisting of one or more layers of water-permeable non-woven mesh made of recycled carpet fibres and plastic bottles and expanded foam as a buoyancy body. JP 2002 142583 describes a vegetated island of plantable water-absorbent material consisting of a non-woven mesh structure with built-in expanded foam rods. US 2019/0230877 A1 describes a buoyant island comprising a plurality of plastic tubes arranged in parallel, with plants growing in the interstices. WO 2019/104377 A1 describes modules of fetch plastic frames with scoria filled plastic baskets in which plants grow.

However, floatable islands can still offer potential for improvement. Potential for improvement may arise in particular in terms of stability, sustainability and design flexibility. In particular, there may be potential for improvement in the improvement of water quality through the island, as well as in the installation of the island.

SUMMARY

This section provides a general summary of the disclosure, and is not a comprehensive disclosure of its full scope or all of its features.

It is therefore the object of the present disclosure to provide an improved buoyant island.

The disclosure proposes a buoyant island.

The buoyant island comprises at least one layer, said layer comprising grains, said grains consisting essentially of an expanded mineral material, said grains being angular, said grains being compacted in a support structure.

The highly stable, buoyant expanded mineral material is compacted in a support structure, causing the grains of the expanded mineral material to interlock in the support structure and the grains to be enclosed by the support structure. Due to the buoyancy of the expanded mineral material, the proposed buoyant island does not require buoyancy bodies. Accordingly, the proposed disclosure depicts a buoyant natural soil that can be planted or even cultivated.

Surprisingly, it has been shown that such a floating island can improve the water quality of a water body particularly well, counteract and prevent water eutrophication, provide a natural habitat for flora, fauna, fish and other aquatic life, and can be integrated well into the natural landscape without having a negative environmental impact on flora, fauna and water bodies. In particular, such a floating island can promote microbial degradation processes of water pollutants and create a natural aquatic as well as terrestrial ecosystem without having to significantly interfere with existing flora and fauna or with the water body itself, its structure and in particular the water level. The buoyant islands according to the disclosure advantageously provide a natural mineral soil material for flora and fauna and, due to a large surface area, also a habitat for the colonisation of nutrient- and pollutant-degrading microorganisms, as well as a habitat for terrestrial and aquatic organisms. In addition, the flexible structure of the layers according to the disclosure makes them resistant to damage caused by frost. Furthermore, by dispensing with floating bodies, a natural root penetration of the entire island can be achieved, whereby a higher water treatment performance can be achieved.

In addition, it was surprisingly shown that such a floating island can purify rainwater and wastewater particularly well. In particular, microbial degradation processes of water pollutants can be promoted by such a buoyant island, so that the buoyant island purifies ponds, lakes, streams, rivers, oceans as well as rainwater and heavily polluted wastewater, especially surface runoff from urban and agricultural areas, municipal wastewater, industrial wastewater or mine wastewater. Due to the grains, water can be treated in a particularly natural way. Furthermore, by dispensing with floating bodies, a particularly high purification efficiency of the water can be achieved, as the entire island body can be rooted and accordingly no micro-channels are formed through which water passes the island untreated. The island is therefore suitable for the treatment of fresh and salt water.

Furthermore, it was surprisingly shown that such a buoyant island is particularly well suited for hydroponic systems. Due to the bulkiness of the grains, the mineral material provides an improved substrate for the development of plant roots, as it can adapt to the space requirements of the growing roots by rearranging the grains. The buoyant island can be fully recycled after harvesting. In particular, the buoyant island is a particularly sustainable and resource-efficient way for hydroponics and/or aquaponics.

In addition, it was shown in a surprising way that such a floating island is particularly well suited for freshwater and seawater aquacultures. In particular, such an island removes the nutrients that enter the water through food residues and excretions of aquatic life. Accordingly, such a floating island maintains ecologically good water quality. Surprisingly, it could be shown that such floating islands increase fish production, lower the water temperature due to the low thermal conductivity of the mineral material, and create a habitat due to the plant roots. Furthermore, breeding tanks can be separated into individual areas by the island, so that, for example, fish and crustaceans can be bred in one tank.

Furthermore, it could be shown in a surprising way that the flexible structure of the floating island can reduce wave movements particularly well. In particular, the floating islands provide protection against shoreline erosion. In particular, the floating island provides soil for the reforestation of mangroves, which are particularly threatened by rising sea levels.

The floating island according to the disclosure is also advantageously suitable for land reclamation on water, for example for the fortification and expansion of nature reserves, the greening of urban areas, the creation of recreational areas, coastal protection, and the creation of building ground on water. In particular, the floating island provides a base for at least one building, for example a house, a row of houses or commercial properties, and/or other structures, such as roads, public squares, gardens, parks, football fields, airfields.

For the purposes of the disclosure, the term "buoyant island" means in particular an island which can be surrounded by water, in particular fully surrounded by water. A "buoyant island" is also an island that is temporarily completely below the water level, for example due to waves.

For the purposes of the disclosure, the term "mineral material" means a material which is solid under normal conditions, usually crystalline, and which can be produced by geological processes.

For the purposes of the disclosure, the term "honeycomb or cellular structure" means a support structure which partially or completely surrounds and encloses the "mineral material".

In one embodiment of the disclosure, it may be provided that the grains comprise a plurality of different mineral materials.

In a preferred embodiment of the disclosure, it may be provided that the mineral material has a low density, preferably a density less than or equal to the density of water, in particular a density less than or equal to 1 g/cm³.

In particular, for the purposes of the present disclosure, a density is to be understood as the dry bulk density.

Advantageously, this means that the buoyant island does not need to have any additional devices in order to be buoyant.

In a preferred embodiment of the disclosure, it may be provided that the grains have an average grain size which makes the layer of the buoyant island suitable as a rooting space for plants. In particular, this is to be understood as an average grain size in the size range of sand, gravel or stones. In particular, it may be provided that the grains have an average grain size in a range from 2 mm to 100 mm, preferably in a range from 10 mm to 500 mm.

The mean grain size and the grain diameter are the equivalent diameter of the mass average $D_{50}$ of the grains measured by sieving according to DIN 66165.

Due to the grain sizes described above, it can be advantageously achieved that, after compaction, fillings of the grains have corresponding gaps so that roots of plants can grow through them.

In a preferred embodiment of the disclosure, it may be provided that the mineral material has pores. In the context of the disclosure, this means that the mineral material is porous, i.e. has a corresponding void volume.
This makes it advantageous that the mineral material has a large surface area for the settlement of microorganisms that break down pollutants. In addition, a high thermal insulation can be achieved so that the island sustainably lowers the water temperature and prevents a temperature increase in areas critical for fish and other aquatic life. Furthermore, the evaporation of water can be reduced.

In one embodiment of the disclosure, it may be provided that the mineral material has a dry thermal conductivity in a range from greater than or equal to 0.02 W/(m K) to less than or equal to 0.3 W/(m K), preferably from greater than or equal to 0.06 W/(m K) to less than or equal to 0.1 W/(m K).

In a preferred embodiment of the disclosure, it may be provided that the mineral material consists essentially of expanded mineral material, preferably selected from the group consisting of expanded glass, in particular foam glass and mixtures thereof. It may be envisaged that the expanded mineral material is a natural or, due to addition of thermal energy, an artificially expanded mineral material, as well as a mixture of natural and artificially expanded mineral materials.

In this way, it can be advantageously achieved that the grains have advantageous grain sizes, density, strength and pores. This results in the advantages described above.

For example, the layer may comprise grains of foam glass having a dry density in a range from greater than or equal to 0.1 g/cm³ to less than or equal to 0.3 g/cm³ and an average grain size from greater than or equal to 2 mm to less than or equal to 260 mm. Alternatively or additionally, the layer may comprise, for example, grains of volcanic slag having a dry bulk density in a range from greater than or equal to 0.8 g/cm³ to less than or equal to 1.7 g/cm³ and a mean grain size of greater than or equal to 6 mm to less than or equal to 500 mm.

For example, the layer may have grains of foam glass with a uniaxial compressive strength in a range from greater than or equal to 0.01 kN/cm² to less than or equal to 0.057 kN/cm². In addition, the surface of foam glass has a water absorption coefficient in a range from greater than or equal to 10% to less than or equal to 1%, wherein the internal water absorption coefficient of foam glass grains is 0%. This can advantageously ensure that the grains are particularly resistant to compressive loads, do not absorb pollutants and provide a large surface area for microbial growth. In particular, foam glass with capillary-breaking or capillary-capable properties, or mixtures thereof, may be used. The grains of cellular glass have an angular shape because the material is broken during the manufacturing process. Accordingly, the individual grains tilt into each other, which makes it possible to produce particularly stable layers when the angular grains are compacted.

In a preferred embodiment of the disclosure, it may be provided that at least one layer comprises a honeycomb or cellular structure, the structure comprising one or more parallel strips connected to each other in a laterally offset manner. In particular, it may be provided that the strips are flexible so that honeycombs or cells are formed when the structure is extended in an accordion-like manner. In this way, it can be achieved in a particularly advantageous way that the honeycomb or cellular structure can be transported easily and compactly in the folded state and can be extended on site to form a large surface.

It may be provided that the honeycomb or cellular structure has a bottom, the bottom being connected at right angles to the lower longitudinal side of the strips. In this way, it can be achieved in a particularly advantageous manner that the honeycomb or cellular structure can be filled with grains and then compacted so that the at least one layer of grains gives the structure buoyancy on water. In particular, it may be envisaged that the bottom is made of the same material as the strips. Alternatively, the bottom may comprise a plurality of parallel wires, in particular wire ropes, connected or interwoven in a laterally offset manner. In particular, it may be envisaged that the wires are flexible so that honeycombs or cells are formed when the structure is extended in an accordion-like manner. Alternatively, the bottom may be made of a degradable material so that the floor dissolves over time once the floating island is installed. In this way, several interconnected layers can be made, with only the lowest layer having a bottom.

It may further be provided that the honeycomb or cellular structure comprises a plurality of strips, in a range from greater than or equal to 60 strips to less than or equal to 30 strips, wherein the strips may have a height in a range from greater than or equal to 40 cm to less than or equal to 20 cm, wherein the strips may have a length in a range from greater than or equal to 240 cm to less than or equal to 120 cm. In a preferred embodiment of the disclosure, it may be provided that the strips and the base are provided with openings. In addition, it may be provided that the openings have a width which is smaller than the average grain size of the grains of the at least one layer. In this way, it can be achieved in a particularly advantageous manner that the grains interlock during compaction in the honeycombs or cells of the structure and that the structure is permeable to water and roots.

It may be envisaged that the honeycomb or cellular structure consists essentially of stainless steel welded mesh. Alternatively, the honeycomb or cellular structure may be made of a coated mineral fibre composite, coated metal, geotextile and/or plastic. Furthermore, it may be provided that the strips and the bottom of the honeycomb or cellular structure are fixedly or flexibly connected to each other. By this it is to be understood that the individual strips and the bottom of mineral fibre composite, coated metal, geotextile and/or plastic can be firmly or flexibly connected to each other. The design of the honeycomb or cellular structure can provide additional stability to the buoyant island.

The design of the honeycomb or cellular structure can provide additional stability to the buoyant island.

For example, the strips and the bottom can be made of a geotextile, with the joints of the strips and the bottom being made by a seam or by adhesive. Alternatively, the strips and the bottom may be made of plastic, in particular HDPE (High Density Polyethylene) or PP (Polypropylene), the strips and the bottom being welded together by ultrasound. It can be provided that the material surface has a texture. In this way, it can be achieved in a particularly advantageous manner that the grains of the at least one layer in the honeycomb or cellular structure interlock and bond with the structure.

In a preferred embodiment of the disclosure, it can be provided that the material of the strips or of the structure has a restoring force by which the grains introduced into the structure are held. In this sense, the structure exerts a spring force on the inserted and compacted grains, by which a breaking apart of the compacted grains can be reduced, preferably avoided. This also makes it possible to pull the structure apart again for refilling in the event of any loss of material in the grains and to insert new grains, which are then integrated into the existing filling by the restoring force of the structure.

In a preferred embodiment of the disclosure, it may be provided that the strips and the bottom comprise a flexible grid, the grid having a mesh size that is smaller than the average grain size of the grains of the at least one layer. Preferably, the mesh size of the grid may be in a range between 15 mm×15 mm to 35 mm×35 mm, such as 25 mm×25 mm. Preferably, the diameter of the grid bars or wires may be in a range between 1 mm to 5 mm, such as 2 mm.

For example, the grid can be made of mineral fibres, especially glass fibres, coated and bonded with an elastic polymer or bitumen. Alternatively, the grid may be made of HDPE or PE with the joints made by ultrasonic welding. Alternatively, the grid may be made of metal wire, wherein the metal grid may have a coating, wherein the connections may be made by wrapping through a wire.

In the context of the present disclosure, a honeycomb or cellular structure means a body that holds grains together and forms a buoyant island with them.

In a preferred embodiment of the disclosure, it may be provided that the island comprises a plurality of honeycomb or cellular structures, wherein the honeycomb or cellular structures are directly or indirectly connected to each other and wherein the honeycomb or cellular structures may independently have different heights.

In one embodiment of the disclosure, it may be provided that the plurality of honeycomb or cellular structures are interconnected by connecting devices in the honeycomb or cellular structure. A connecting device is understood to mean openings in the honeycomb or cellular structure which, when overlapping, can be connected horizontally in the longitudinal and transverse directions by a screw with nut or bolt with pin.

In a preferred embodiment of the disclosure, it may be provided that the honeycomb or cellular structure is traversed by horizontally extending ropes or chords. The ropes or chords are threaded through the folded honeycomb or cellular structure and then attached to the bank of a body of water.

In this way, it can be advantageously achieved that the honeycomb or cellular structure can be extended along the ropes or chords on the water surface in an accordion-like manner. In particular, ropes or chords can facilitate the connection of two or more honeycomb or cellular structures. Furthermore, ropes or chords can facilitate the filling of the honeycomb or cellular structure with buoyant mineral material, for example with a concrete pump, and the compaction, for example with a vibrator.

In a preferred embodiment of the disclosure, it may be provided that the floating mineral material is compacted in the honeycomb or cellular structure with a suitable device so that the grains interlock in the openings or meshes of the structure.

In this way, it can be advantageously achieved that the grains of the layer are held together and a fluid exchange of the environment with the grains of the layer remains possible. In addition, it can be achieved in a particularly advantageous manner that the present disclosure does not require a float, since the highly buoyant mineral material supports the honeycomb or cellular structure.

Furthermore, it can be achieved that the at least one layer can be completely colonized by plant roots and thus a dense root network forms underneath the floating island.

In addition, it can be achieved that the layer can react flexibly to movements of the environment, such as wave movements or mechanical stress. Furthermore, with appropriately large grain sizes, openings and mesh sizes, it can be achieved that small fish and other small aquatic organisms can also pass through the openings. This can lead to a higher biodiversity as well as an increase in species population and an improvement of the ecosystem.

In one embodiment of the disclosure, it may be provided that a binder is disposed between the grains. Preferably, the binder is a strong, flexible adhesive, for example a drainage concrete or a synthetic resin made of polyurethane, which is applied in liquid form to the surface of one layer and then hardens.

In this way, it can be achieved in a particularly advantageous manner that the layer retains its shape, whereby the interstices and porous structure of the layer are not adversely affected and the layer remains water-permeable and rootable after the binder has hardened. In this respect, the application of a binder to the surface of the at least one layer provides protection against mechanical effects and abrasion of the surface, in particular abrasion by wind or waves. The application of a binder to the surface of the at least one layer in the area of ropes or wires thus increases the stability of the floating island.

In one embodiment of the disclosure, it may be provided that the island comprises a plurality of layers, preferably at least two layers, in particular at least three layers, the plurality of layers being arranged in layers on top of each other.

In this way, it can be achieved that the buoyant island can have different properties on its surface than on its underside. In particular, it can be achieved that the layers have a different buoyancy, so that layers reach deeper into the water than others. In particular, it can be achieved that the surface is particularly suitable for planting plants and the underside is suitable as a habitat for aquatic life.

In one embodiment of the disclosure, it may be provided that at least one layer is connected to at least one other layer.

In one embodiment of the disclosure, it may be provided that the plurality of layers comprises grains having different grain diameters, preferably the average grain diameter of the grains of a lower layer being larger than the average grain diameter of the grains of an upper layer.

The different grain sizes can be used to advantageously shape the buoyancy of the islands and create aerobic and anaerobic zones. In this way, the buoyancy can be adapted to the respective application. For example, a preferred habitat for nitrifying and denitrifying microorganisms can be created.

The different grain sizes can be used to filter solids and suspended matter from the water as it flows through the layers. In particular, the flow direction of water through the floating island can be influenced by different grain sizes and thus the residence time of water in the island body can be extended.

Accordingly, the honeycomb or cellular structures of the layers can also have different openings or mesh sizes. For example, the lowest layer can be designed with larger grain sizes and wider openings or meshes than the layers above.

In one embodiment of the disclosure, the layer or plurality of layers may be selected so that the island extends to different water depths and acts as a filter of solids and suspended solids present in the water when the water is flowing horizontally. The island may be designed so that the layer or plurality of layers of mineral material extend to the bottom of the water body so that contaminated water is passed through the layer or layers of the island and is filtered.

In this respect, it can be provided that the layer or a plurality of layers rest on the bottom of a water body so that contaminated water flows through the layers. If the water level rises sharply, the floating island adapts to the water level. This is a particularly advantageous way of doing without bypass channels, as is usual with horizontal flow constructed wetlands.

In one embodiment of the disclosure, it may be provided that plants are planted in the surface of the buoyant island.

This allows the island to blend naturally into its surroundings. In addition, the plants can hold the layers and grains of the buoyant island together and give the island additional stability. The roots of the planted plants can preferably grow into the spaces between the grains of the layer and offer a protective effect against abrasion of the mineral material. In doing so, the roots can reach into the water beyond the underside of the buoyant island.

In addition, it can be achieved that the island is perfectly suitable for the cultivation of crops. Due to the different grain size distribution of the material and the different buoyancy of the material, the islands can be adapted to the requirements of the plants regarding the depth of the island in water. This is particularly advantageous when growing economically valuable plants. Aquaculture operators, for example, can earn a sideline by cultivating economically valuable plants.

In a preferred embodiment of the disclosure, it may be provided that planting of the buoyant island is achieved by sowing seeds or by planting seedlings on the surface from the top layer.

In doing so, the roots can advantageously enclose the individual grains and thus reduce abrasion that can occur with friction, for example, with wave movements or mechanical effects between the grains. In addition, it can be achieved that roots of neighbouring plants intertwine and interlock and create a flexible root network. This can further achieve that the grains are held together, and the layers become naturally more stable and flexible.

The plants can also advantageously cause roots to grow through the layers and penetrate into the body of water underneath the island. Through further entanglement and hooking in the water body, a dense root network can be formed. This can create a large surface area for nutrient- and pollutant-degrading microorganisms, whereby the plants can absorb pollutants directly from the water and sustainably remove them from the water body. In addition, the root network formed in the water can serve as a filter for suspended matter, to which pollutants are often adsorbed.

The pollutants can be removed from the water directly by absorption into the plant roots or by microbial processes. The microorganisms can live in a sticky biofilm on the root surface. Suspended matter can adhere to the sticky biofilm and form clumps that sink to the bottom of the water when they become too heavy and detach from the root surface. The root network also provides a habitat, refuge, breeding space and also source of food for fish and other aquatic life.

In one embodiment of the disclosure, it may be provided that layers of the plurality of honeycomb or cellular structures have grains with different grain diameters. Preferably, it may be provided that portions of the layers of structures in the edge region or upstream have larger grain diameters than layers of structures in the centre of the island or downstream. For example, a layer of a structure at the edge of the island may have grains with a grain size in the range of 20 mm to 50 mm and a layer of an island module at the centre of the island may have grains in the range of 2 mm to 10 mm.

In one embodiment of the disclosure, it may be provided that the honeycomb or cellular structures extend to different water depths.

The different grain sizes allow to filter solids and suspended matter from the water as it flows through the layers and to control the direction of water flow.

This can advantageously achieve that the residence time of water is influenced, the water is directed to certain areas and the island body is passable for fish and other aquatic life.

The disclosure still proposes the use of a buoyant island for improving water quality, counteracting and/or preventing water eutrophication, as a habitat for flora, fauna, fish and other aquatic life, as green corridors for connecting habitats, as protection against bank erosion, for reducing the flow velocity of the water body, for treating stormwater, for treating wastewater, for creating recreational areas, for land reclamation and/or for water cultures.

In detail, it is envisaged that a floating island as described above is placed in a body of water or water tank in a floating manner and, if necessary, planted.

In a preferred embodiment of the disclosure, it may be provided that buoyant islands are connected to each other in a modular manner to form different shapes. In addition, it can be provided that the floating island is connected to anchoring devices on the shore or water bottom via ropes and/or chains in order to hold the island in one position. The length of the ropes and/or chains can be selected in such a way that the floating island can adapt to changes in the water level. Components made of concrete or other suitable materials with a large weight can be used as mooring devices. In urban waters with fortified banks, it may be envisaged that the buoyant island is pile-mounted or designed on a pulley guide mounted on the vertical bank. The ropes also serve as a connecting device of honeycomb structures, as well as an installation device of the honeycomb structure on water.

DRAWINGS

The drawings described herein are for illustrative purposes only of selected embodiments and not all possible implementations, and are not intended to limit the scope of the present disclosure.

The disclosure is further explained below with reference to the figures. The figures show possible embodiments of the disclosure. In principle, however, combinations or variations of the embodiments are also possible within the scope of the disclosure.

Corresponding reference numerals indicate corresponding parts throughout the several views of the drawings.

DETAILED DESCRIPTION

Example embodiments will now be described more fully with reference to the accompanying drawings.

Figure 1:
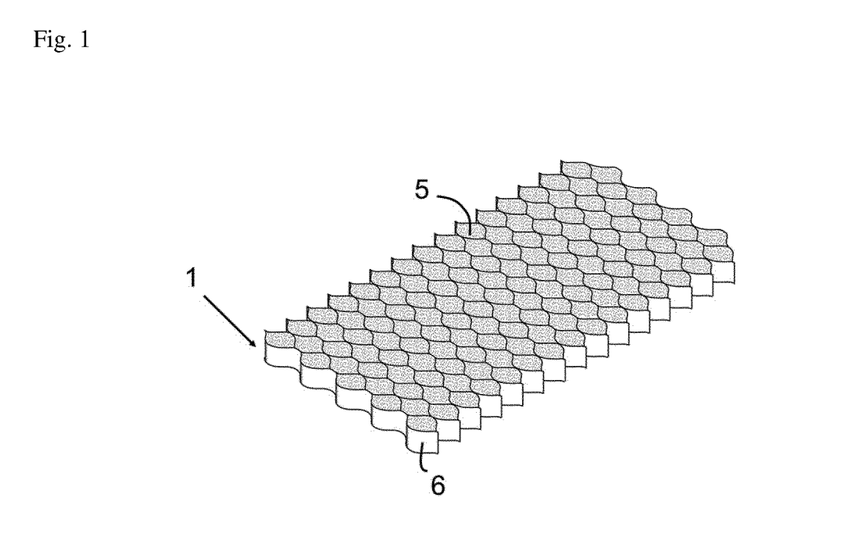
FIG. 1 shows isometrically the first embodiment of the buoyant island.

FIG. 1 shows an isometric embodiment of the buoyant island. The island of the embodiment shown has a layer 1. A layer 1 consists of a honeycomb structure 6, said honeycombs are filled with highly buoyant mineral material 5. The honeycomb structure 6 may be made of metal, plastic, mineral fibres or other suitable materials. In a preferred embodiment, the shape of the buoyant island may correspond to the shape shown, but may also be formed in any other shapes.

Figure 2:
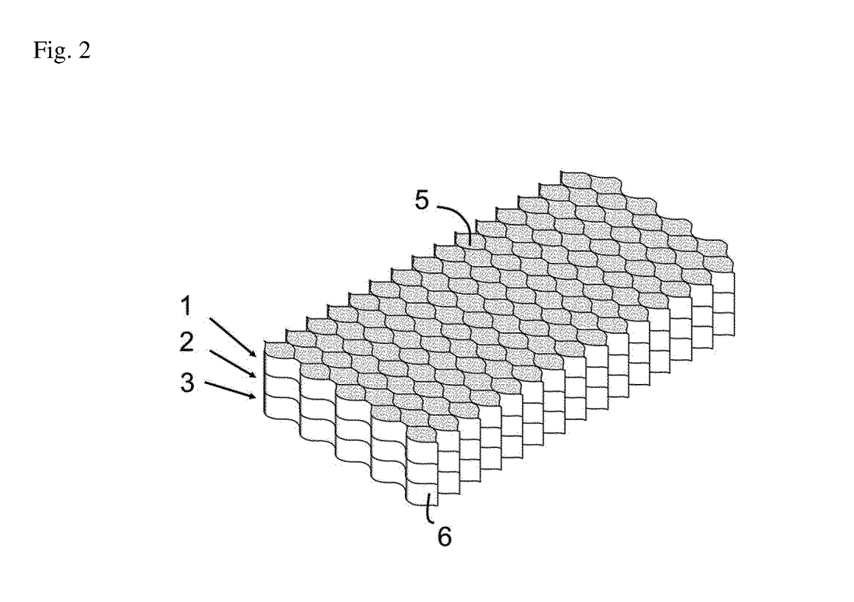
FIG. 2 shows isometrically the first embodiment of the floatable island from FIG. 1 with several layers.

FIG. 2 shows isometrically an embodiment of the buoyant island of FIG. 1, wherein the island has an upper layer 1, a middle layer 2 and a lower layer 3.

Figure 3:
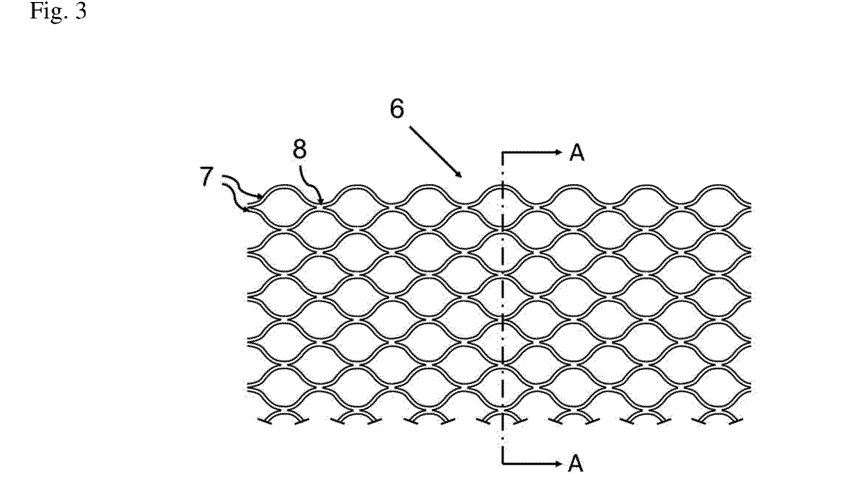
FIG. 3 shows a top view of the first embodiment.

FIG. 3 shows a top view of one embodiment of the honeycomb structure 6 of the buoyant island. The honeycomb structure 6 consists of parallel flexible or rigid strips 7 of equal height, the strips being connected to each other in a laterally offset manner at constant intervals via connections 8. The strips may be made of welded mesh, for example stainless steel or titanium, the joints 8 of the strips 7 being made by open press clamps or spot welding. Alternatively, the strips may be made of polymers, for example UV stabilised HDPE, with the joints 8 of the strips 7 being ultrasonically welded. Alternatively, the strips may be made of woven mineral fibres, for example glass fibres with a coating of bitumen or other suitable materials.

Figure 4:
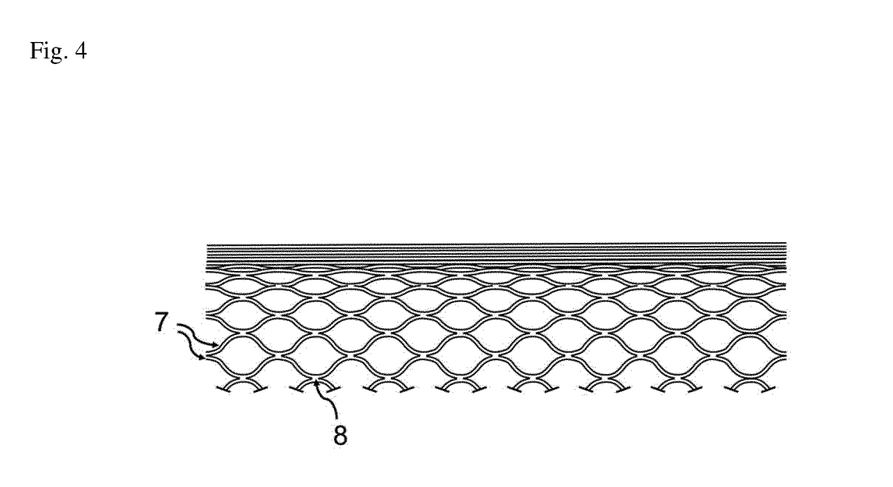
FIG. 4 shows the first embodiment in top view, with the honeycomb structure extended in an accordion-like manner.

FIG. 4 shows the first embodiment of the honeycomb structure 6 from FIG. 3 in top view, whereby the strips are flexible. The distances of the connections 8 are arranged in such a way that the flexible strips lying flat on top of each other can be pulled out to form said honeycomb structure 6. Accordingly, the strips 7 of the honeycomb structure 6 are flexible.

Figure 5:
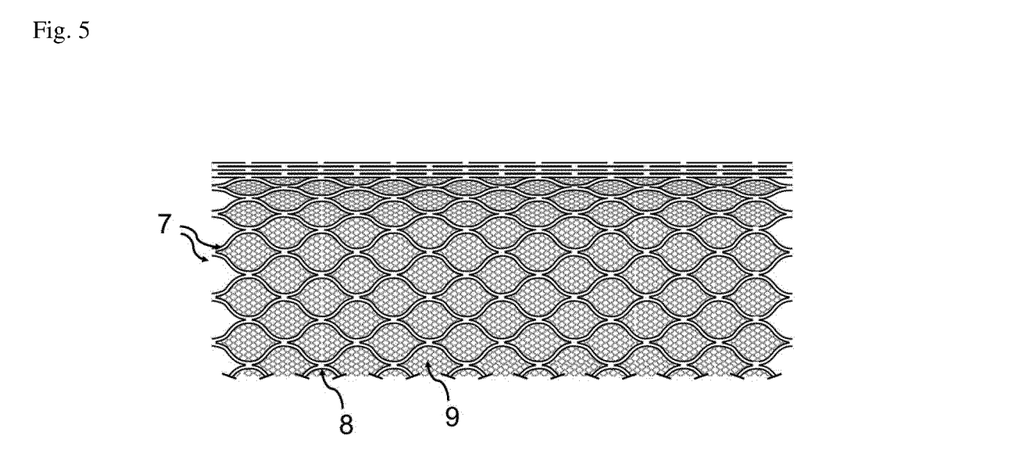
FIG. 5 shows a top view of the first embodiment of FIG. 4, wherein the honeycomb structure has a flexible bottom.

FIG. 5 shows the first embodiment of the flexible honeycomb structure 6 from FIG. 4 in plan view, whereby the flexible honeycomb structure 6 has a bottom 9 which is connected to the honeycomb structure 6 by connections 8. The bottom 9 consists of ropes arranged in parallel, the ropes being connected to one another at constant intervals via connections 8 in a laterally offset manner. The ropes may be made of wires, for example of stainless steel or titanium, the connections 8 of the ropes being made by open press clamps. Alternatively, the wire ropes may be braided together. Alternatively, the ropes can be made of polymers, for example UV stabilised HDPE, whereby the connections 8 of the ropes can be knotted or ultrasonically welded.

Figure 6:
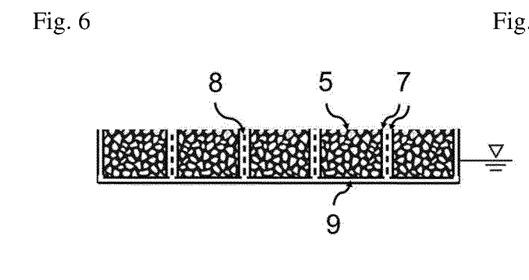
FIG. 6 shows a section A-A of a first embodiment taken along line A-A as shown in FIG. 3.

FIG. 6 shows a section A-A through the honeycomb structure 6 of FIG. 3. The honeycomb structure 6, consisting of interconnected strips 7, thus has a bottom 9 which is connected to the honeycomb structure 6 by connections 8. The bottom 9 facilitates the filling and compacting of the honeycombs with buoyant mineral material 5. The bottom 9 can be flexible, as in FIG. 5, or made of the same material as the strips 7 of the honeycomb structure 6 in FIG. 2. Accordingly, the bottom 9 can be solid.

Figure 7:
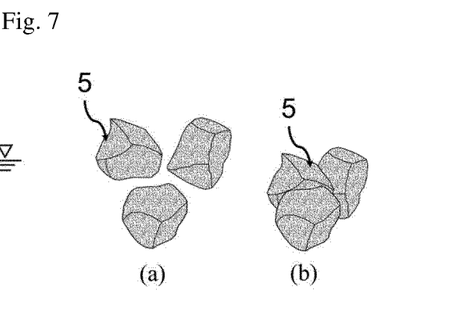
FIGS. 7(a) and 7(b) show the shape of the grains of the buoyant mineral material.

FIG. 7a shows the buoyant mineral material 5 which has edges in its shape. FIG. 7b shows the buoyant mineral material 5 which, when compacted, interlocks with each other due to its angular shape.

Figure 8:
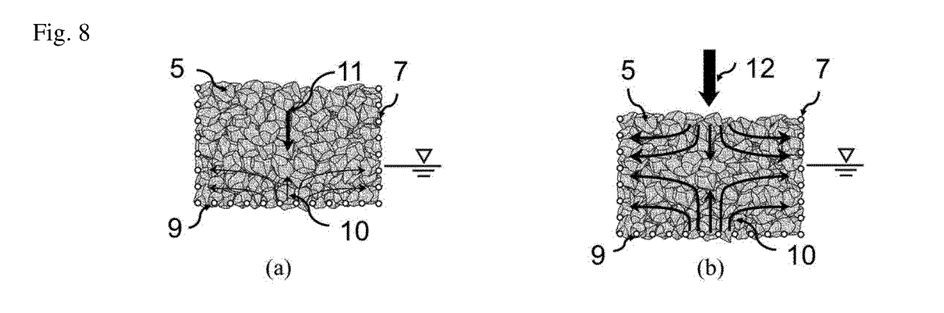
FIG. 8 shows the distribution of forces within a honeycomb of the honeycomb structure of FIG. 6, filled and compacted with buoyant mineral material.

FIG. 8 shows the distribution of forces within a honeycomb of the honeycomb structure 6 of FIG. 6 filled with buoyant mineral material 5 and compacted. FIG. 8a shows the distribution of buoyant forces 10 of the buoyant mineral material 5, whereby the buoyant forces 10 are diverted in horizontal direction due to the interlocked grains of the buoyant mineral material 5 of FIG. 7 and are finally carried away by the strips 7. The grains of the buoyant mineral material 5 become wedged in the openings or perforated surface of the strips 7. In addition, the weight force 11 of the mineral material 5 above the water level counteracts the buoyant force 10. FIG. 8b shows the distribution of forces within a honeycomb of the honeycomb structure 6 from FIG. 6 under pressure load 12, for example by a person or a structure, so that the honeycomb is submerged deeper into the water and the buoyancy force 10 counteracts the pressure force 12.

Figure 9:
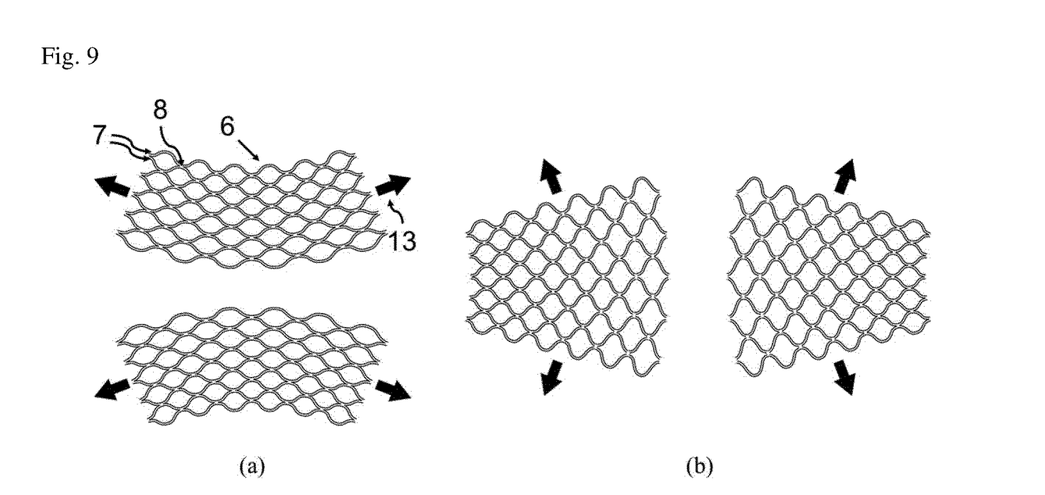
FIG. 9a shows the first embodiment of FIG. 4 in top view, with the honeycomb structure having a bend using a directional tensile force in the horizontal direction.
FIG. 9b shows the first embodiment of FIG. 4 in top view with bending of the honeycomb structure by applying a directional tensile force in the vertical direction.

FIG. 9 shows the first embodiment of the flexible honeycomb structure 6 of FIG. 4 in top view, wherein the flexible honeycomb structure 6 has a bend under application of a directional tensile force 13, whereby the honeycomb structure 6 can be formed. FIG. 9a shows bending of the honeycomb structure 6 using a directional tensile force in the horizontal direction. FIG. 9b shows the bending of the honeycomb structure 6 by applying a directional tensile force in the vertical direction.

Figure 10:
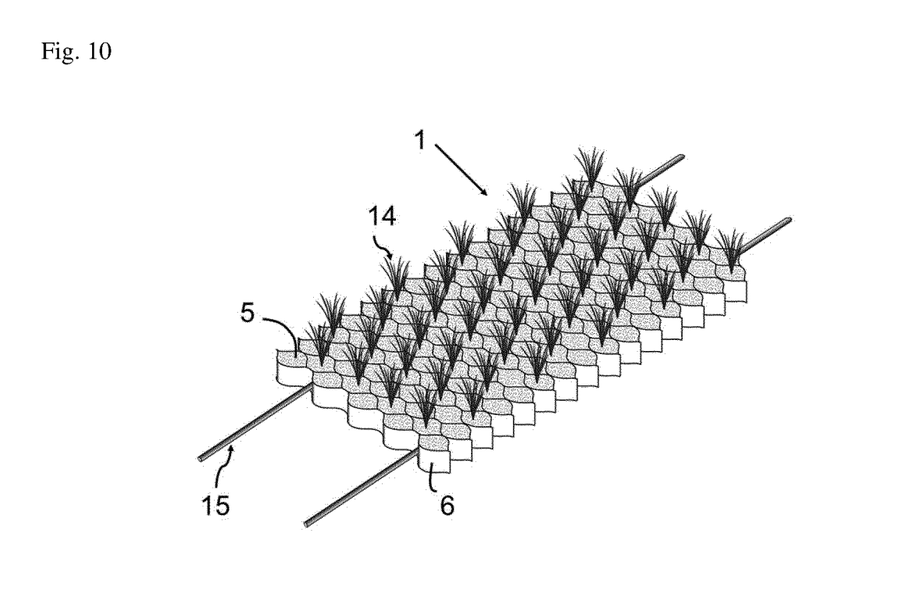
FIG. 10 shows isometrically the first embodiment of FIG. 1 with plants.

FIG. 10 shows isometrically an embodiment of the floating island from FIG. 1, whereby layer 1 is planted with young plants 14. The honeycomb structure 6 has ropes 15 running through it, the ends of which are anchored to the bank of a body of water or the edge of a tank. The ropes 15 allow the honeycomb structure 6 to be filled with mineral material 5 and then the mineral material 5 to be compacted directly on water.

Figure 11:
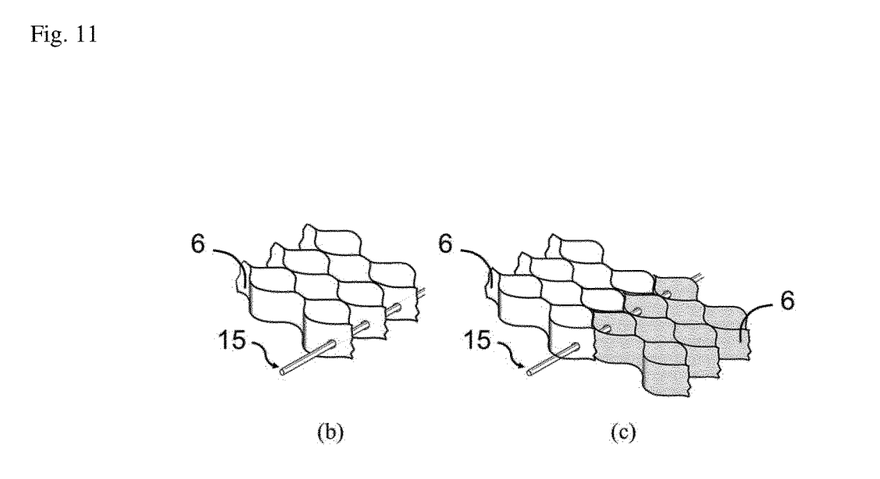
FIGS. 11(b) and 11(c) each show isometrically a section of the honeycomb structure from FIG. 1 with ropes.

FIG. 11 shows an isometric section of the honeycomb structure 6 from FIG. 1, with ropes 15 running through the honeycomb structure 6 (FIG. 11(*b*)). The ropes 15 can also be used to connect two or more honeycomb structures 6 (FIG. 11(*c*)).

Figure 12:
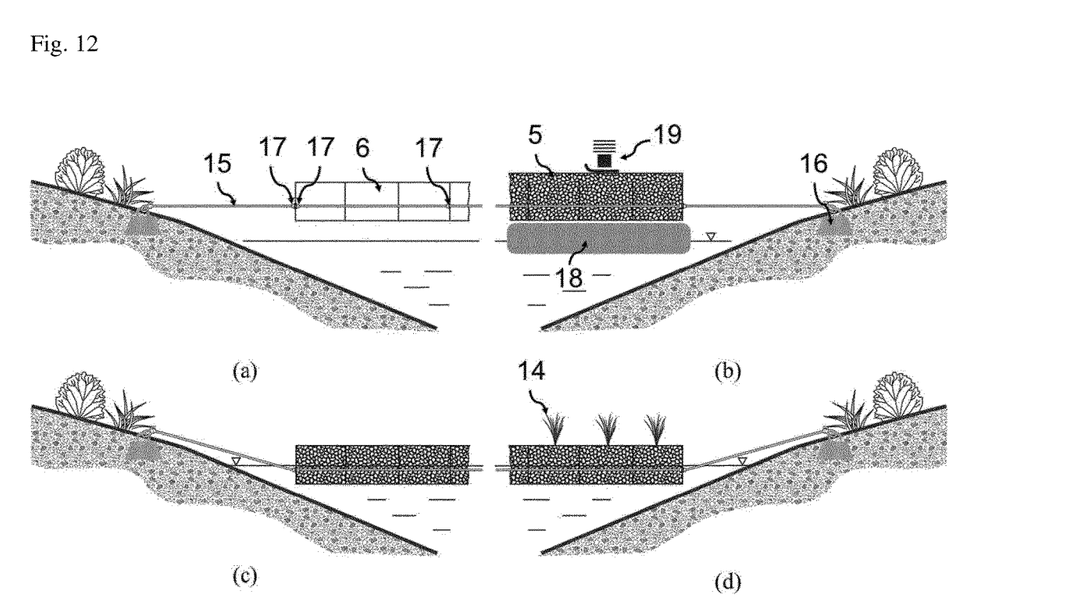
FIG. 12 shows schematically the procedure for installing the first embodiment of the floating island on water.

FIG. 12 schematically shows the procedure for installing the first embodiment of the floating island from FIG. 10 on water. The ropes 15 are threaded through the folded honeycomb structure 6 and are attached and tensioned to anchoring devices 16. The honeycomb structure 6 is extended along the ropes and fixed to the rope with clamps 17 (FIG. 12a). The extended honeycomb structure 6 is filled in sections with mineral material 5 and optionally compacted using a floating platform 18 with a compaction device 19, for example a vibrating plate (FIG. 12b). The ropes 15 are then released from the anchorage and fixed so that the island floats in water and can adapt to changes in the water level (FIG. 12c). The floating island can then be planted with young plants 14 (FIG. 12d).

Figure 13:
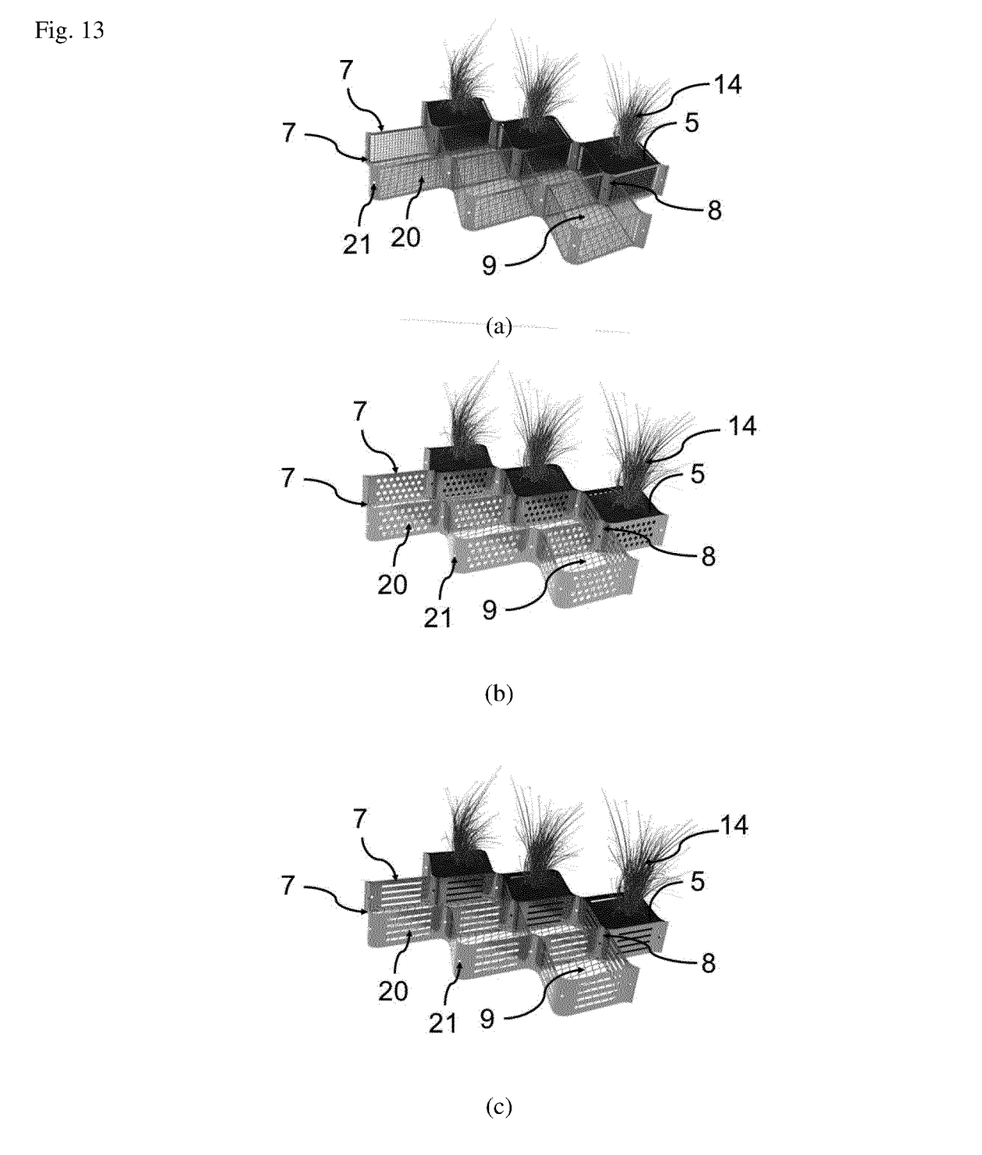
FIG. 13 shows isometric sections of different variants of the honeycomb structure from FIG. 10.

FIG. 13 shows an isometric section of the honeycomb structure 6 from FIG. 10. The strips 7 have openings 20, whereby the openings 20 can have different shapes, for example the openings 20 can be square (FIG. 13a), round (FIG. 13b), oval or rectangular (FIG. 13c). Holes 21 are provided along the joints 8 of the strips 7. Ropes 15 can run through the holes 21, whereby the holes 21 also serve to connect two or more honeycomb structures on the transverse and longitudinal sides of the honeycomb structure 6 by suitable connecting devices, for example by lacing, screwing, bolt or pin connections or other suitable connecting devices.

Figure 14:
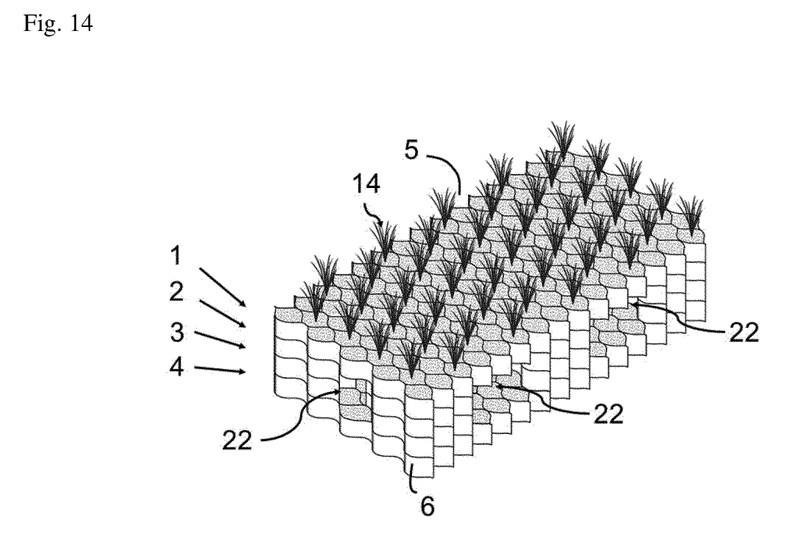
FIG. 14 shows isometrically an embodiment of the floating island from FIG. 2, whereby the island consists of four layers and has openings in the middle layer.

FIG. 14 shows an isometric embodiment of the buoyant island of FIG. 2, the island having a further layer 4 and openings 22 in layers 2 and 3. The openings 22 can be created in any size and arrangement by cutting the layers 2 and 3. The openings 22 can penetrate the entire island, thereby regulating the flow of water within the layers 2 and 3, thereby distributing the flow of water within the island so that polluted water is distributed particularly efficiently within the island body and comes into contact with the roots of the plants 14. The openings 22 can also occur only at the edge of the island, so that the openings 22 can be used as burrows for aquatic life, for example lobsters. Accordingly, the island can be used for aquaculture.

Figure 15:
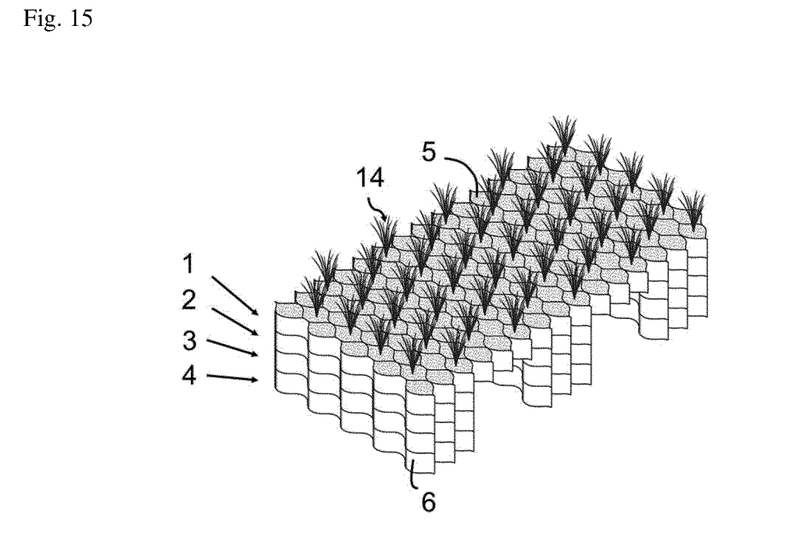
FIG. 15 shows isometrically an embodiment of the buoyant island from FIG. 2, whereby the island consists of an upper layer and in sections of further layers.

FIG. 15 shows isometrically an embodiment of the buoyant island of FIG. 2, where the island consists of an upper layer 1 and sections of further layers 2, 3 and 4, resulting in sections of the island with greater depths. The sections consisting of several layers can be of any depth and act as a filter for suspended matter and as resistance to flow. In this way, the residence time of polluted water, for example rainwater or river water, can be increased within the island and the flow velocity of the water can be reduced, increasing the cleaning efficiency of the polluted water. Furthermore, the deeper layers, for example at the edges of the island, allow the volume for water treatment to be separated from the rest of the water body.

Figure 16:
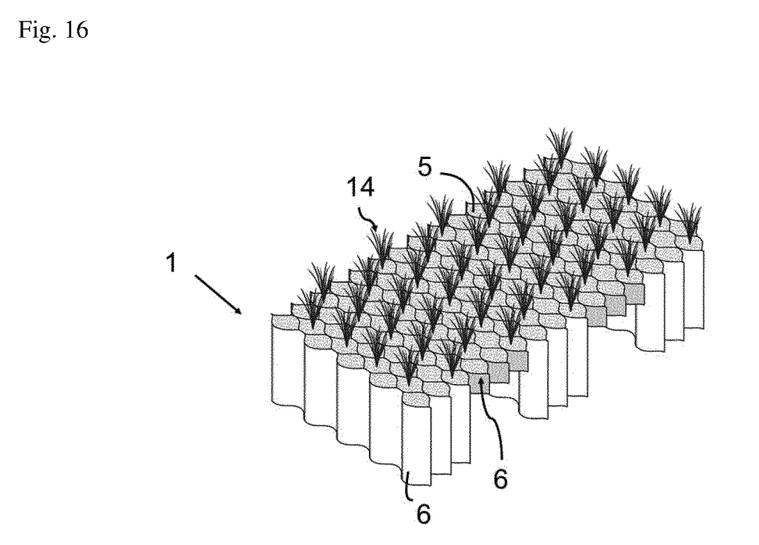
FIG. 16 shows isometrically an embodiment of the buoyant island of FIG. 15, where the layers are connected to each other with different depths.

FIG. 16 shows isometrically an embodiment of the buoyant island from FIG. 15, whereby the layers of the honeycomb structure 6 with different depths can be connected to each other.

Figure 17:
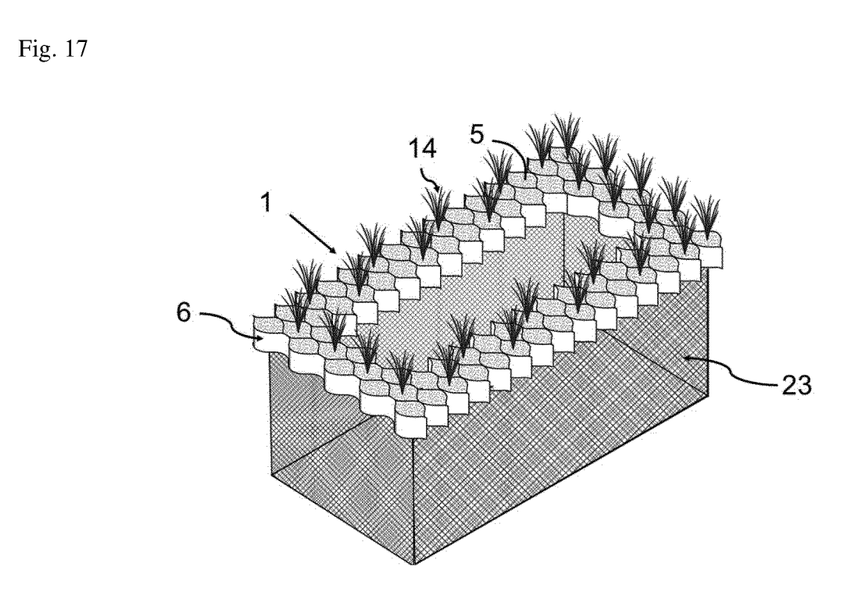
FIG. 17 shows an isometric embodiment of the buoyant island of FIG. 10, wherein the interior of the honeycomb structure is open.

FIG. 17 shows isometrically an embodiment of the floatable island from FIG. 10, whereby the interior of the honeycomb structure 6 is open. Accordingly, light and oxygen can enter the water inside the honeycomb structure 6, whereby microbial purification processes in the water can be influenced. A net 23 can be attached to the underside of the honeycomb structure 6, resulting in a breeding container for aquatic life. For example, several breeding containers can be installed in one breeding tank, whereby different aquatic organisms can be bred in one breeding tank.

Figure 18:
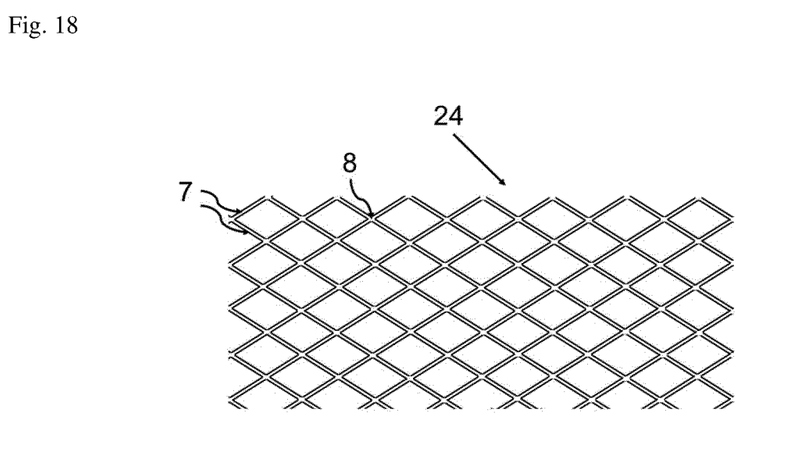
FIG. 18 shows a second embodiment of the floating island in top view.

FIG. 18 shows, similar to FIG. 3, a second embodiment of the floating island from FIG. 1 in plan view, whereby the layer 1 has a cell structure 24. The cell structure 24, similar to the honeycomb structure 6 of FIGS. 1-17, consists of parallel, flexible strips 7 of equal height, the strips 7 being connected to each other at constant intervals in a laterally staggered manner via connections 8, the cell structure having a bottom 9, similar to FIG. 5. The strips 7 and bottom 9 may be made of non-woven geotextile, for example a polymer. Alternatively, the strips and bottom may be made of a mesh, for example a coated wire, coated glass fibres, plastic or other suitable materials. The cell structure 24 results significantly from the use of other materials of the strips 7 and their joints 8, whereby the cell structure 24 results from pulling the flexible strips lying flat on top of each other.

Figure 19:
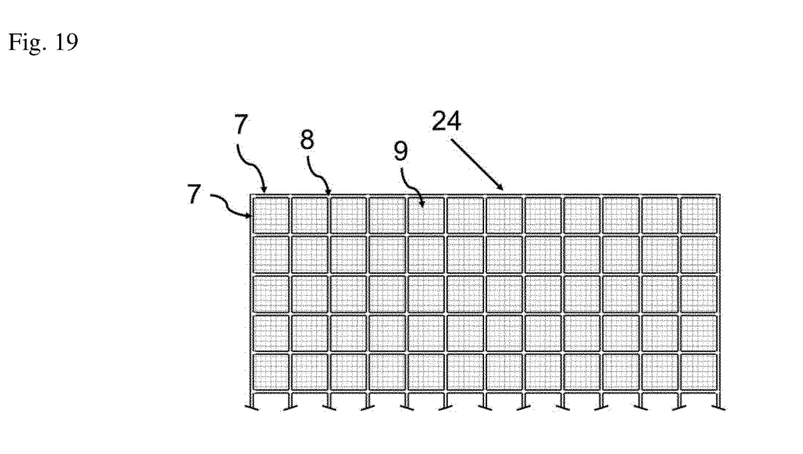
FIG. 19 shows a third embodiment of the floating island in top view.

FIG. 19 shows, similar to FIG. 3 and FIG. 18, a third embodiment of the floating island from FIG. 1 in plan view, whereby the layer 1 has a cell structure 24 consisting of squares. The cell structure 24 consists of interconnected strips 7, the cell structure having a solid bottom 9. The strips 7 and the bottom 9 may be made of a grid, for example a welded grid of stainless steel. Alternatively, the cell structure 24 may be made of an injection moulded part, for example of HDPE, wherein the cell structure 24, similar to FIG. 13, has openings which are round, oval, square or rectangular in shape. In addition, the material surface can have a texture so that the angular grains of the mineral material 5 additionally interlock in the cell structure 24. The cell structure 24 essentially results from the use of fixed connections, whereby the cell structure 24 is not flexible, as in the first and second embodiments.

Figure 20:
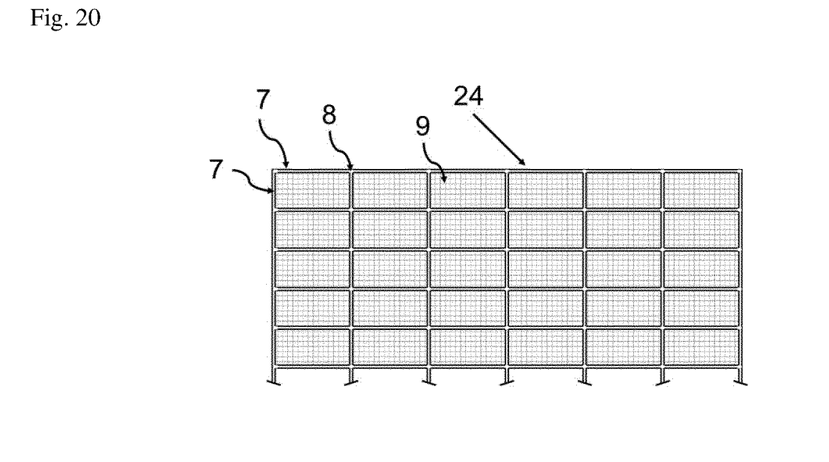
FIG. 20 shows, similar to FIG. 19, the third embodiment of the floating island in top view, where the cell structure comprises rectangles.

FIG. 20 shows, similarly to FIG. 19, the third embodiment of the floating island from FIG. 1 in plan view, whereby the layer 1 has a cell structure 24 consisting of rectangles.

Figure 21:
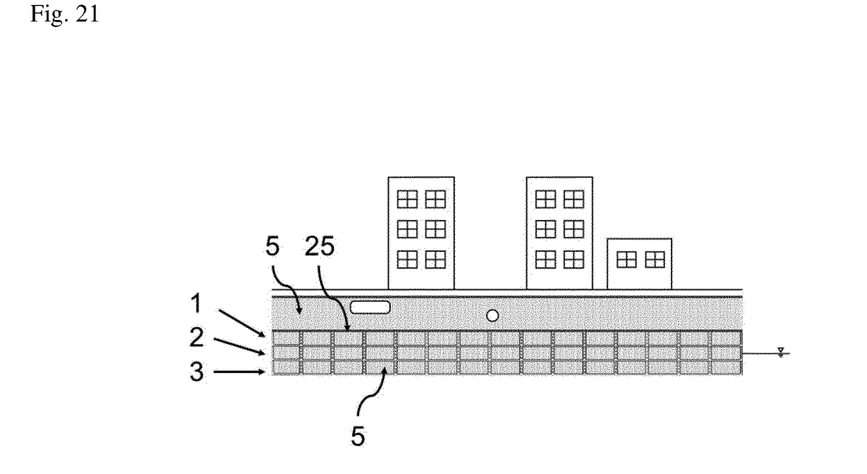
FIG. 21 shows a side view of a fourth embodiment of the floating island for supporting buildings.

FIG. 21 shows a fourth embodiment of the floating island from FIG. 2 in side view, whereby the layers 1, 2 and 3 have a cellular structure or gabion construction filled with buoyant mineral material 5. A reinforced concrete slab 25 is provided at the upper layer 1, which can be built on with buildings and roads. Mineral material 5 is provided as an intermediate layer for laying infrastructure, for example pipes and sewers, in order to keep the superimposed load as low as possible.

In FIG. 2, the island consists of three layers 1, 2, 3. In practice, the island can consist of one layer 1 or several layers. The depth of a layer can be arbitrary, and layers with different depths can be connected to each other.

The foregoing description of the embodiments has been provided for purposes of illustration and description. It is not intended to be exhaustive or to limit the disclo-sure. Individual elements or features of a particular embodiment are generally not limited to that particular embodiment, but, where applicable, are interchangeable and can be used in a selected embodiment, even if not specifically shown or de-scribed. The same may also be varied in many ways. Such variations are to be regarded as a departure from the disclosure, and all such modifications are intended to be included within the scope of the disclosure.

The invention claimed is:

1. A floating island comprising at least one layer, said at least one layer comprising a structure with grains, said grains consisting of a foam glass gravel expanded mineral material.

2. The floating island of claim 1, wherein said grains are angular and buoyant, the angular and buoyant grains are compacted in the structure, wherein the angular and buoyant grains are compacted to be interlocked with each other and in the structure to provide buoyancy to the structure.

3. The floating island according to claim 1, the structure comprising multiple flexible strips, the strips being arranged in parallel, the strips being connected in a laterally staggered manner so that the plurality of strips form are shaped as honeycombs or cells.

4. The floating island according to claim 3, wherein the honeycombs or cells comprise a bottom of the structure.

5. The floating island according to claim 3, wherein the strips have openings.

6. The floating island according to claim 3, wherein the strips have a perforated surface.

7. The floating island according to claim 1, wherein a binder is arranged between the grains, the binder comprises an elastic adhesive or drainage concrete.

8. The floating island according to claim 1, wherein the island comprises, at least three layers, wherein the layers are arranged on top of each other.

9. The floating island according to claim 8, wherein the layers comprise grains having different mean grain diameters, preferably the mean grain diameter of the grains of a lower layer being larger than the mean grain diameter of the grains of an upper layer.

10. The floating island according to claim 1, wherein the floating island comprises plants planted in a surface of the floating island.

11. A method of improving water quality with floating islands according to claim 1 comprising placing the floating island in a body of water in a floating manner and is planted with plants.

12. A method of making a floating island comprising the steps of:
   (a) providing a structure to receive grains of expanded mineral material, which is foam glass gravel,
   (b) inserting grains of said expanded mineral material into the provided structure,
   (c) compacting of the inserted grains with the provision so that they interlock with each other and in the structure,
   (d) application of a binder to the surface of the floating island, and/or installation of a grid on the surface of the floating island.

13. The method of claim 12, further comprising providing an additional plurality of structures and interconnecting the plurality of additional structures with the structure to receive grains of expanded mineral material to form the floating island.

* * * * *